United States Patent
Ewart et al.

(10) Patent No.: US 9,428,595 B2
(45) Date of Patent: *Aug. 30, 2016

(54) ETHYLENE-BASED POLYMERS AND PROCESSES TO MAKE THE SAME

(75) Inventors: Sean W. Ewart, Pearland, TX (US); Teresa P. Karjala, Lake Jackson, TX (US); Sarat Munjal, Lake Jackson, TX (US); Mehmet Demirors, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/127,802

(22) PCT Filed: Jun. 21, 2012

(86) PCT No.: PCT/US2012/043422

§ 371 (c)(1),
(2), (4) Date: Dec. 19, 2013

(87) PCT Pub. No.: WO2013/006276

PCT Pub. Date: Jan. 10, 2013

(65) Prior Publication Data

US 2014/0135462 A1    May 15, 2014

Related U.S. Application Data

(60) Provisional application No. 61/504,379, filed on Jul. 5, 2011.

(51) Int. Cl.
C08F 4/44        (2006.01)
C08F 2/00        (2006.01)
(Continued)

(52) U.S. Cl.
CPC . C08F 4/52 (2013.01); C08F 4/38 (2013.01); C08F 10/02 (2013.01)

(58) Field of Classification Search
CPC ............ C08F 4/52; C08F 4/38; C08F 10/02; C08F 2/38; C08F 4/34

USPC ................................ 526/184, 348, 226, 222
See application file for complete search history.

(56) References Cited

U.S. PATENT DOCUMENTS 3,198,780 A * 8/1965 Mortimer et al. ............ 526/184
3,929,754 A * 12/1975 Gloriod et al. ............... 526/119
(Continued)

FOREIGN PATENT DOCUMENTS

EP        0741145 A1    11/1996
EP        2256158 A1    12/2010
(Continued)

OTHER PUBLICATIONS

Huff et al., Reaction of Polymeric Radicals with Organoaluminum Compounds, Journal of Polymer Science: Part A, 1963, 1553-1572 vol. 1.

(Continued)

*Primary Examiner* — William Cheung

(57) ABSTRACT

The invention provides a process to form an ethylene-based polymer, said process comprising polymerizing ethylene in the presence of at least one free-radical agent, and in the presence of a "metal alkyl-containing compound" selected from the group consisting of the following: i) at least one "Group II metal alkyl-containing compound," ii) at least one "Group III metal alkyl-containing compound," or iii) a combination of i) and ii). The invention also provides a composition comprising at least one ethylene-based polymer, prepared from a free-radical polymerization, and wherein the ethylene-based polymer has the following property: $y > 0.28567x - 0.00032$, wherein $y = $ vinyl/1000C, as determined by $^1$H NMR, and $x = $ mol % polymerized α-olefin, as determined by $^{13}$C NMR.

11 Claims, 5 Drawing Sheets

(51) Int. Cl.
*C08F 4/12* (2006.01)
*C08F 210/00* (2006.01)
*C08F 4/52* (2006.01)
*C08F 10/02* (2006.01)
*C08F 4/38* (2006.01)

(56) References Cited

U.S. PATENT DOCUMENTS

| | | |
|---|---|---|
| 5,539,075 A | 7/1996 | Gustafsson et al. |
| 5,973,087 A | 10/1999 | Luft et al. |
| 6,521,734 B1 | 2/2003 | Araki et al. |
| 7,767,613 B2 | 8/2010 | Mihan |
| 8,202,958 B2 | 6/2012 | Demirors et al. |
| 8,541,519 B2 | 9/2013 | Demirors et al. |
| 8,697,807 B2 | 4/2014 | Demirors et al. |
| 9,045,628 B2 | 6/2015 | Ewart et al. |
| 2004/0152591 A1 | 8/2004 | Jin et al. |
| 2010/0041840 A1 | 2/2010 | Johansson et al. |
| 2010/0087606 A1 | 4/2010 | Karjala et al. |
| 2010/0108357 A1 | 5/2010 | Smedberg et al. |
| 2011/0130533 A1 | 6/2011 | Karjala et al. |
| 2011/0196105 A1 | 8/2011 | Eddy et al. |
| 2013/0253126 A1 | 9/2013 | Ewart et al. |
| 2014/0213735 A1 | 7/2014 | Demirors et al. |
| 2015/0148504 A1* | 5/2015 | Ewart .................. C08F 110/02 526/184 |

FOREIGN PATENT DOCUMENTS

| | | |
|---|---|---|
| EP | 2256159 A1 | 12/2010 |
| JP | 2004-010665 A | 1/2004 |
| WO | 97/45465 A1 | 12/1997 |
| WO | 2010042390 A1 | 4/2010 |
| WO | 2011019563 A1 | 2/2011 |

OTHER PUBLICATIONS

Huff et al., The Reaction of Styryl Radicals with Organoaluminum Compounds, J. Am. Chem. Soc., 1960, 4277-4281, vol. 82.

Milovskaya et al., Synthesis and Characteristics of Polystyryl Aluminum Derivatives and Their Reaction with Benzoyl Peroxide, Polymer, 1982, 891-896, vol. 23.

Götz et al., Influence of Aluminum Alkyl Compounds on the High-Pressure Polymerization of Ethylene with Ternary Metallocene-Based Catalysts. Investigation of Chain Transfer to Aluminum, Macromol. Mater. Eng., 2002, 16-22, vol. 287.

Gridnev et al., Catalytic Chain Transfer in Free-Radical Polymerizations, Chem. Rev., 2001, 3611-3659, vol. 101.

Mortimer, Chain Transfer in Ethylene Polymerization. VII. Very Reactive and Depletable Transfer Agents, Journal of Polymer Science: Part A-1, 1972, 163-168, vol. 10.

International Preliminary Report on patentability for PCT/US2012/043422, Date of Issuance Jan. 7, 2014, 7 Pages.

Grotewold et al., Triethylaluminum as a Concentrate-Dependent Coinitiator and Chain-Transfer Agent of Free-Radical Polymerization of Methyl Methacrylate in the Presence of Benzoquinone, Journal of Polymer Science: Polymer Chemistry Edition, 1977, 393-404, vol. 15.

International Search Report and Written Opinion for PCT/US2012/043422, Mail Date Sep. 24, 2012, 9 Pages.

* cited by examiner

ETHYLENE-BASED POLYMERS AND PROCESSES TO MAKE THE SAME

REFERENCE TO RELATED APPLICATIONS

This application is a National Stage Application under 35 U.S.C. Section 371 of PCT International Application No. PCT/US 2012/043422, filed Jun. 21, 2012, which claims priority to U.S. Provisional Patent Application No. 61/504,379, filed on Jul. 5, 2011, the entire contents of which are incorporated by reference herein.

BACKGROUND

Chain transfer agents are used to control the molecular weight of low density polyethylene. Highly active chain transfer agents (Cs>1) are desirable in a free-radical polymerization, for example, a tubular free-radical process, to produce low density polyethylene (LDPE) with a narrow molecular weight distribution. LDPE with a narrow molecular weight distribution imparts improved optics in films prepared from such polymers. However, such conventional chain transfer agents typically result in undesirable byproducts in the final polymer product. Therefore, this is a need for new free-radical polymerization processes, using new chain transfer agents, to form ethylene-based polymers, such as LDPE, with narrow molecular weight distributions. There is a further need for such processes, in which small amounts (ppm levels) of chain transfer agents act as "catalytic type" agents to minimize undesirable byproducts in the final polymer.

Huff et al., *Reaction of Polymeric Radicals with Organoaluminum Compounds*, Journal of Polymer Science: Part A, 1963, 1, 1553-1572, discloses the reactivities of polystyryl, polymethyl methacrylyl, and polyacrylonitryl radicals, with thirteen organometallic substrates, chosen from Groups 2b, 3a, 4a, and 5a of the Periodic Table.

Huff et al., *The Reaction of Styryl Radicals with Organoaluminum Compounds*, J. Am. Chem. Soc., 1960, 82, 4277-4281, discloses the reaction of styryl radicals with organoaluminum compounds.

Grotewold et al., *Triethylaluminum as a Concentrate-Dependent Coinitiator and Chain-Transfer Agent of Free-Radical Polymerization of Methyl Methacrylate in the Presence of Benzoquinone*, Journal of Polymer Science: Polymer Chemistry Edition, 1977, 15, 393-404, discloses the polymerization of methyl methacrylate (MMA) in the presence of triethylaluminum (TEA) and benzoquinone (BQ).

Milovskaya et al., *Synthesis and Characteristics of Polystyryl Aluminum Derivatives and Their Reaction with Benzoyl Peroxide*, Polymer, 1982, 23, 891-896, discloses the polymerization of styrene in the presence of triethylaluminum as a chain transfer agent.

Götz et al., *Influence of Aluminum Alkyl Compounds on the High-Pressure Polymerization of Ethylene with Ternary Metallocene-Based Catalysts. Investigation of Chain Transfer to Aluminum*, Macromol. Mater. Eng., 2002, 287, 16-22, discloses the influence of aluminum alkyl compounds on the metallocene-catalyzed, high pressure polymerization of ethylene.

U.S. Pat. No. 6,521,734 discloses a low-density polyethylene resin for laminates. The low-density polyethylene resin is obtained by a high pressure, radical polymerization, and has a density of 0.910 to 0.935 g/cc, a melt flow rate of 0.1 to 300 g/10 min, and a terminal vinyl group number of "0.4 or more per 1,000 carbon atoms." This patent also discloses that a laminate having high interlayer adhesion strength can be obtained by low-temperature, high-speed molding, so that the occurrence of smoking and odor can be prevented. The laminate is suitable for food wrapping materials and containers.

U.S. Pat. No. 5,539,075 discloses an unsaturated ethylene copolymer, a method for producing this ethylene copolymer, and the use of the ethylene copolymer in compositions for producing cross-linked structures, such as materials for electric cables. Ethylene and at least one monomer are polymerized at a pressure of about 100-300 MPa, and a temperature of about 80° C.-300° C., under the action of a radical initiator. The at least one monomer is copolymerizable with ethylene, and includes a polyunsaturated comonomer having a chain of at least eight carbon atoms and at least two non-conjugated double bonds, of which at least one is terminal. The polyunsaturated comonomer preferably is an $\alpha,\omega$-alkadiene having 8-16 carbon atoms, most preferred 1,9-decadiene. The polymerization may also involve another vinyl-unsaturated monomer, preferably containing at least one functional group selected from hydroxyl groups, alkoxy groups, carbonyl groups, carboxyl groups and ester groups. The ethylene copolymers are disclosed as having an increased degree of unsaturation, which can be used for cross-linking the ethylene copolymer or grafting reactive groups.

U.S. Publication 2010/0108357 discloses a crosslinkable polymer composition comprising the following properties a) an unsaturated polyolefin having a total amount of "carbon-carbon double bonds per 1000 carbon atoms" of at least 0.38, and b) at least one crosslinking agent. The crosslinking agent is a carbon-carbon initiator that is free of peroxide groups, and capable of thermally decomposing into carbon-based free radicals by breaking at least one carbon-carbon single bond (for example, 3,4-dimethyl-3,4-diphenyl-hexane).

Additional polymerization processes and/or polymer products are disclosed in the following references: Gridnev et al., *Catalytic Chain Transfer in Free-Radical Polymerizations*, Chem. Rev., 2001, 101, 3611-3659; Mortimer, *Chain Transfer in Ethylene Polymerization. VII. Very Reactive and Depletable Transfer Agents*, Journal of Polymer Science: Part A-1, 1972, 10, 163-168; International Publication Nos. WO 2010/042390, 2011/019563, 1997/45465; European Application Nos. EP 2256158A1, EP2256159A1; U.S. application Ser. No. 12/701,859; and U.S. Pat. No. 7,767,613.

As discussed above, there remains a need for new free-radical polymerization processes, using new chain transfer agents, to form ethylene-based polymers, such as LDPE, with narrow molecular weight distributions. There is a further need to minimize undesirable byproducts in the final polymer. There is also a need for such ethylene-based polymers, such as LDPEs, that have high vinyl levels and lower levels of incorporated $\alpha$-olefin chain transfer agents, as compared to, for example, conventional LDPEs with high vinyl levels. These needs and others have been met by the following invention.

SUMMARY OF INVENTION

The invention provides a process to form an ethylene-based polymer, said process comprising polymerizing ethylene in the presence of at least one free-radical agent, and in the presence of a "metal alkyl-containing compound" selected from the group consisting of the following:

i) at least one "Group II metal alkyl-containing compound,"

ii) at least one "Group III metal alkyl-containing compound," or iii) a combination of i) and ii).

The invention also provides a composition comprising at least one ethylene-based polymer, prepared from a free-radical polymerization, and wherein the ethylene-based polymer has the following property:

$$y > 0.28567x - 0.00032,$$

wherein y=vinyl/1000 C, as determined by 1H NMR, and x=mol % polymerized α-olefin, as determined by 13C NMR.

The invention also provides a composition comprising at least one ethylene-based polymer, prepared from a free-radical polymerization, and wherein the ethylene-based polymer has the following properties:

A) a vinyl content greater than, or equal to, 0.3 vinyl per 1000 C (total carbons), and B) a polymerized alpha-olefin level less than, or equal to, 1.00 mole percent, based on the total moles of polymerized monomers.

DETAILED DESCRIPTION

Figure 1:
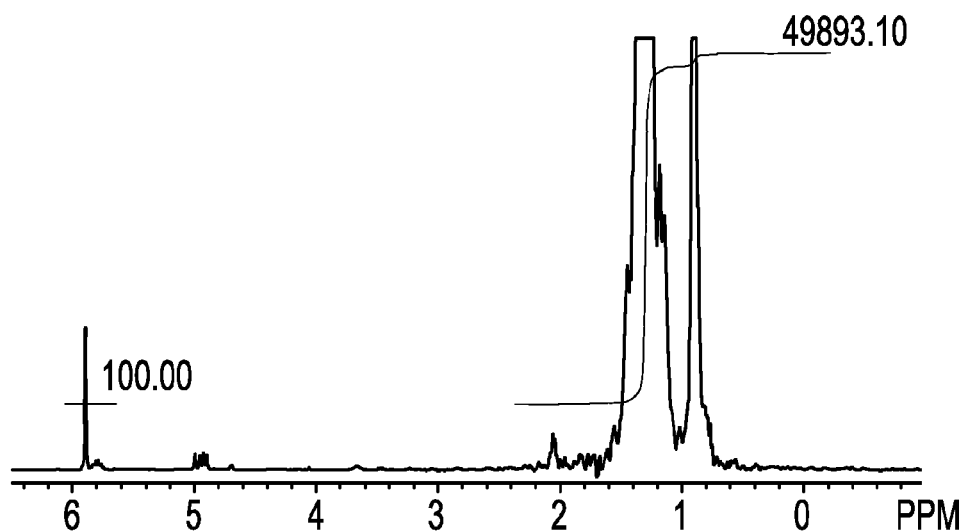
FIG. 1 depicts the 1H NMR spectrum, without presaturation, of an inventive LDPE (Example 5).

It has been discovered that low levels of a "metal alkyl-containing compound," as described herein, serve as highly active chain transfer agents in the free-radical polymerization of ethylene-based polymers, such as low density polyethylenes (LDPEs). The low levels of the "metal alkyl-containing compound" required to decrease the molecular weight of an ethylene-based polymer, suggest that, under typical free-radical polymerization conditions, these compounds act as catalytic chain transfer agents.

It has also been discovered that the addition of an "metal alkyl-containing compound" to a free-radical ethylene polymerization process results in an ethylene-based polymer (for example, LDPE) with a narrower molecular weight distribution and increased vinyl group content, as compared to ethylene-based polymer formed from free-radical processes using conventional chain transfer agents. The inventive polymers also have lower levels of incorporated α-olefin chain transfer agents.

As discussed above, the invention provides a process to form an ethylene-based polymer, said process comprising polymerizing ethylene in the presence of at least one free-radical agent, and in the presence of a "metal alkyl-containing compound" selected from the group consisting of the following:

i) at least one "Group II metal alkyl-containing compound,"

ii) at least one "Group III metal alkyl-containing compound," or iii) a combination of i) and ii).

An inventive process may comprise any one of the embodiments described herein.

An inventive process may comprise a combination of two or more embodiments as described herein.

In one embodiment, the "metal alkyl-containing compound" is i) at least one "Group II metal alkyl-containing compound."

In one embodiment, the "metal alkyl-containing compound" is ii) at least one "Group III metal alkyl-containing compound."

In one embodiment, the "metal alkyl-containing compound" is a combination of i) at least one "Group II metal alkyl-containing compound," and ii) at least one "Group III metal alkyl-containing compound."

In one embodiment, the "metal alkyl-containing compound" is present in an effective amount less than, or equal to, 100 mole ppm metal, based on the total moles of ethylene added to the polymerization.

In one embodiment, the "metal alkyl-containing compound" is present in an effective amount greater than zero and less than, or equal to, 100 mole ppm metal, based on the total moles of ethylene added to the polymerization.

In one embodiment, the "metal alkyl-containing compound" comprises at least one Al-alkyl bond.

In one embodiment, the "metal alkyl-containing compound" is a "Group III metal alkyl-containing compound. In a further embodiment, the metal is aluminum.

In one embodiment, the metal of the "metal alkyl-containing compound" is aluminum.

In one embodiment, the free-radical agent is a peroxide.

In one embodiment, the polymerization takes place in at least one reactor. In a further embodiment, the reactor is a tubular reactor. In another embodiment, the reactor is an autoclave reactor.

In one embodiment, the polymerization takes place in a combination of at least one tubular reactor and at least one autoclave reactor.

In one embodiment, the "metal alkyl-containing compound" is present in an effective amount≤80 molar ppm metal, or ≤70 molar ppm metal, or ≤60 molar ppm metal, based on the total moles of ethylene added to the polymerization. In a further embodiment, the metal is aluminum.

In one embodiment, the "metal alkyl-containing compound" is present in an effective amount≤50 molar ppm metal, ≤40 molar ppm metal, ≤30 molar ppm metal, based on the total moles of ethylene added to the polymerization. In a further embodiment, the metal is aluminum.

In one embodiment, the "metal alkyl-containing compound" is present in an effective amount≤25 molar ppm metal, or ≤20 molar ppm metal, or ≤15 molar ppm metal, based on the total moles of ethylene added to the polymerization. In a further embodiment, the metal is aluminum.

In one embodiment, the "metal alkyl-containing compound" is present in an amount >0 molar ppm metal, or ≥1 molar ppm metal, or ≥2 molar ppm metal, based on the total moles of ethylene added to the polymerization. In a further embodiment, the metal is aluminum.

In one embodiment, the "metal alkyl-containing compound" is present in an amount >1 molar ppm metal, or ≥3 molar ppm metal, or ≥5 molar ppm metal, based on the total moles of ethylene added to the polymerization. In a further embodiment, the metal is aluminum.

In one embodiment, the "metal alkyl-containing compound" is present in an effective amount from 1 to 100 molar ppm metal, based on the total moles of ethylene added to the polymerization. In a further embodiment, the metal is aluminum.

In one embodiment, the "metal alkyl-containing compound" is present in an effective amount from 2 to 50 molar ppm metal, based on the total moles of ethylene added to the polymerization. In a further embodiment, the metal is aluminum.

In one embodiment, the "metal alkyl-containing compound" is present in an effective amount from 5 to 20 molar ppm metal, based on the total moles of ethylene added to the polymerization. In a further embodiment, the metal is aluminum.

In one embodiment, the polymerization temperature is from 140° C. to 350° C.

In one embodiment, the polymerization temperature is from 160° C. to 325° C.

In one embodiment, the polymerization temperature is from 180° C. to 300° C.

In one embodiment, the polymerization temperature is greater than, or equal to, 180° C.

In one embodiment, the polymerization pressure is from 16,000 psi (110 MPa) to 60,000 psi (413 MPa).

In one embodiment, the polymerization pressure is from 16,000 psi (110 MPa) to 40,000 psi (276 MPa).

In one embodiment, the polymerization pressure is from 16,000 psi (110 MPa) to 30,000 psi (207 MPa).

In one embodiment, the polymerization pressure is greater than, or equal to, 16,000 (110 MPa) psi, or greater than, or equal to, 20,000 psi (138 MPa).

In one embodiment, no olefinic-chain transfer agent (for example, an α-olefin) is added to the polymerization. In a further embodiment, no propylene and/or no 1-butene is added to the polymerization. In a further embodiment, no propylene is added to the polymerization. In another embodiment, no 1-butene is added to the polymerization.

The invention also provides an ethylene-based polymer formed by an inventive process. In a further embodiment, the ethylene-based polymer is a LDPE homopolymer.

The invention also provides a composition comprising an inventive ethylene-based polymer. In a further embodiment, the composition comprises one or more additives.

In one embodiment, the composition further comprises a heterogeneously branched ethylene/α-olefin interpolymer, and preferably a heterogeneously branched ethylene/α-olefin copolymer. In one embodiment, the heterogeneously branched ethylene/α-olefin interpolymer, and preferably a heterogeneously branched ethylene/α-olefin copolymer, has a density from 0.890 to 0.960 g/cc, or from 0.900 to 0.940 g/cc (1 cc=1 cm³). In a further embodiment, the composition comprises 10 to 50 weight percent, or 20 to 40 weight percent, of the inventive ethylene-based polymer, based on the weight of the composition.

In one embodiment, the inventive ethylene-based polymer is present in an amount greater than, or equal to, 10 weight percent, based on the weight of the composition.

In one embodiment, the inventive ethylene-based polymer is present in an amount from 10 to 50 weight percent, or 15 to 40 weight percent, based on the weight of the composition.

In one embodiment, the composition further comprises another ethylene-based polymer that differs in one or more properties, such as density, melt index, comonomer, comonomer content, etc., from the inventive ethylene-based polymer. Suitable other ethylene-based polymers include, but are not limited to the following: DOWLEX Polyethylene Resins, TUFLIN Linear Low Density Polyethylene Resins, ELITE Enhanced Polyethylene Resins (all available from The Dow Chemical Company); high density polyethylenes (d≥0.96 g/cc); medium density polyethylenes (density from 0.935 to 0.960 g/cc); EXCEED polymers, EXACT polymers, and ENABLE polymers (all from ExxonMobil); AFFINITY polymers, ENGAGE polymers, and INFUSE polymers (all from The Dow Chemical Company); LDPE; and ethylene vinyl acetate (EVA).

In one embodiment, the composition further comprises a propylene-based polymer. Suitable propylene-based polymers include polypropylene homopolymers, propylene/α-olefin interpolymers, and propylene/ethylene interpolymers.

The invention also provides an article comprising at least one component formed from an inventive composition. In a further embodiment, the article is a film.

An inventive article may comprise any one of the embodiments as described herein.

An inventive article may comprise two or more embodiments as described herein.

The invention also provides a composition comprising at least one ethylene-based polymer, prepared from a free-radical polymerization, and wherein the ethylene-based polymer has the following property:

$$y > 0.28567x - 0.00032,$$

wherein y=vinyl/1000 C, as determined by 1H NMR, and x=mol % polymerized α-olefin (for example, propylene), as determined by 13C NMR.

In one embodiment, the ethylene-based polymer has the following property:

$$y > 0.28567x - 0.04,$$

wherein y=vinyl/1000 C, as determined by 1H NMR, and x=mol % polymerized α-olefin (for example, propylene), as determined by 13C NMR.

In one embodiment, the ethylene-based polymer has the following property:

$$y > 0.28567x - 0.13,$$

wherein y=vinyl/1000 C, as determined by 1H NMR, and x=mol % polymerized α-olefin (for example, propylene), as determined by 13C NMR.

In one embodiment, the ethylene-based polymer has the following property:

$$y > 0.28567x - 0.27,$$

wherein y=vinyl/1000 C, as determined by 1H NMR, and x=mol % polymerized α-olefin (for example, propylene), as determined by 13C NMR.

The invention also provides a composition comprising at least one ethylene-based polymer, prepared from a free-radical polymerization, and wherein the ethylene-based polymer has the following properties:

A) a vinyl content greater than, or equal to, 0.3 vinyl per 1000 C (total carbons), and B) a polymerized alpha-olefin level less than, or equal to, 1.00 mole percent, or less than, or equal to, 0.90 mole percent, or less than, or equal to, 0.80 mole percent, or less than, or equal to, 0.70 mole percent, or less than, or equal to, 0.60 mole percent, based on the total moles of polymerized monomers.

An inventive composition may comprise any one of the embodiments described herein.

An inventive composition may comprise a combination of two or more embodiments as described herein.

An inventive ethylene-based polymer (formed by an inventive process described herein, or present in an inventive composition described herein) may comprise any one of the embodiments described herein.

An inventive ethylene-based polymer (formed by an inventive process described herein, or present in an inventive composition described herein) may comprise a combination of two or more embodiments as described herein.

In one embodiment, the ethylene-based polymer has a Mw(conv)/Mn(conv) from 2 to 20.

In one embodiment, the ethylene-based polymer has a Mw(conv)/Mn(conv) from 2 to 12.

In one embodiment, the ethylene-based polymer has a Mw(conv)/Mn(conv) from 2 to 6.

In one embodiment, the ethylene-based polymer has a density from 0.915 to 0.940 g/cc.

In one embodiment, the ethylene-based polymer has a melt index (I2) from 0.05 to 100 g/10 min.

In one embodiment, the ethylene-based polymer has a melt index (I2) from 0.2 to 70 g/10 min.

In one embodiment, the ethylene-based polymer has a melt index (I2) from 1 to 30 g/10 min.

In one embodiment, the ethylene-based polymer has $\geq 0.1$ amyl (C5) branches per 1000 carbon atoms, as determined by 13C NMR.

In one embodiment, the ethylene-based polymer has $\geq 0.3$ amyl branches per 1000 carbon atoms, as determined by 13C NMR.

In one embodiment, the ethylene-based polymer has $\geq 0.5$ amyl branches per 1000 carbon atoms, as determined by 13C NMR.

In one embodiment, the ethylene-based polymer does not comprise a polymerized diene.

In one embodiment, the ethylene-based polymer is formed in a high pressure polymerization process, wherein the polymerization pressure is greater than 100 MPa.

In one embodiment, the ethylene-based polymer is formed at a polymerization temperature from 140° C. to 350° C.

In one embodiment, the ethylene-based polymer is a low density polyethylene homopolymer (LDPE).

In one embodiment, the ethylene-based polymer has a density from 0.915 to 0.940 g/cc.

In one embodiment, the ethylene-based polymer has the following property:

$$y > -0.00899x + 0.919,$$

wherein y=density in g/cc and x=vinyl/1000 C, as determined by 1H NMR.

In one embodiment, the ethylene-based polymer has the following property:

$$y > -0.00899x + 0.9205,$$

wherein y=density in g/cc and x=vinyl/1000 C, as determined by 1H NMR.

In one embodiment, the ethylene-based polymer has the following property:

$$y > -0.00899x + 0.9227,$$

wherein y=density in g/cc and x=vinyl/1000 C, as determined by 1H NMR.

In one embodiment, the composition further comprises one or more additives.

In one embodiment, the composition further comprises a heterogeneously branched ethylene/α-olefin interpolymer, and preferably a heterogeneously branched ethylene/α-olefin copolymer. In one embodiment, the heterogeneously branched ethylene/α-olefin interpolymer, and preferably a heterogeneously branched ethylene/α-olefin copolymer, has a density from 0.890 to 0.960 g/cc, or from 0.900 to 0.940 g/cc. In a further embodiment, the composition comprises 10 to 50 weight percent, or 20 to 40 weight percent, of the inventive ethylene-based polymer, based on the weight of the composition.

In one embodiment, the inventive ethylene-based polymer is present at greater than, or equal to, 10 weight percent, based on the weight of the composition.

In one embodiment, the inventive ethylene-based polymer is present in an amount from 10 to 50 weight percent, or 20 to 40 weight percent, based on the weight of the composition.

In one embodiment, the composition further comprises another ethylene-based polymer that differs in one or more properties, such as density, melt index, comonomer, comonomer content, etc., from the inventive ethylene-based polymer. Suitable other ethylene-based polymers include, but are not limited to the following: DOWLEX Polyethylene Resins, TUFLIN Linear Low Density Polyethylene Resins, ELITE Enhanced Polyethylene Resins (all available from The Dow Chemical Company); high density polyethylenes (d≥0.96 g/cc); medium density polyethylenes (density from 0.935 to 0.960 g/cc); EXCEED polymers, EXACT polymers, and ENABLE polymers (all from ExxonMobil); AFFINITY polymers, ENGAGE polymers, and INFUSE polymers (all from The Dow Chemical Company); LDPE; and ethylene vinyl acetate (EVA).

In one embodiment, the composition further comprises a propylene-based polymer. Suitable propylene-based polymers include polypropylene homopolymers, propylene/α-olefin interpolymers, and propylene/ethylene interpolymers.

The invention also provides an article comprising at least one component formed from an inventive composition. In a further embodiment, the article is a film.

An inventive ethylene-based polymer may comprise two or more embodiments as described herein.

As discussed above, an inventive article may comprise any one of the embodiments as described herein.

As discussed above, an inventive article may comprise two or more embodiments as described herein.

As discussed above, an inventive composition may comprise any one of the embodiments described herein.

As discussed above, an inventive composition may comprise a combination of two or more embodiments as described herein.

As discussed above, an inventive ethylene-based polymer may comprise any one of the embodiments described herein.

As discussed above, an inventive ethylene-based polymer may comprise a combination of two or more embodiments as described herein.

As discussed above, an inventive process may comprise any one of the embodiments described herein.

As discussed above, an inventive process may comprise a combination of two or more embodiments as described herein.

Alkyl Metal—Containing Compound

A "metal alkyl-containing compound" is selected from the group consisting of the following:
  i) at least one "Group II metal alkyl-containing compound,"
  ii) at least one "Group III metal alkyl-containing compound," or
  iii) a combination of i) and ii).

As used herein, the term "metal alkyl-containing compound," refers to a compound containing at least one metal-alkyl bond.

As used herein, the term "Group II metal alkyl-containing compound," refers to a compound containing at least one Group II metal alkyl-bond.

As used herein, the term "Group III metal alkyl-containing compound," refers to a compound containing at least one Group III metal alkyl-bond.

In one embodiment, the metal of the "metal alkyl-containing compound" is aluminum.

In one embodiment, the "metal alkyl-containing compound" comprises at least one Al-alkyl bond.

In one embodiment, the "metal alkyl-containing compound" is selected from the following:

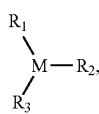 (1)

wherein for Compound 1, M is a Group II or Group III metal, and wherein $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl; and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for Compound 1, M is a Group II or Group III metal, and wherein $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for Compound 1, M is a Group II or Group III metal, and wherein, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, for Compound 1, M is a Group III metal, and wherein $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl; and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for Compound 1, M is a Group III metal, and wherein $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for Compound 1, M is a Group III metal, and wherein, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, for Compound 1, M is a Group II metal, and wherein $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl; and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for Compound 1, M is a Group II metal, and wherein, $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for Compound 1, M is a Group II metal, and wherein, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, the "metal alkyl-containing compound" is selected from the following:

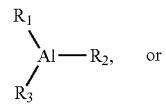 (2)

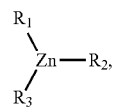 (3)

wherein for each Compound 2 and 3, $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl; and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for each Compound 2 and 3, $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for each Compound 2 and 3, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, the "metal alkyl-containing compound" is selected from the following:

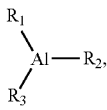

(2)

wherein for Compound 2, $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl; and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for Compound 2, $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for Compound 2, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, the "metal alkyl-containing compound" is selected from the following:

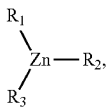

(3)

wherein for Compound 3, $R_1$, $R_2$ and $R_3$ are each independently selected from alkyls, alkoxides or halides, and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls; C1-C10 alkoxides or C1-C5 alkoxides or C1-C3 alkoxides; or Cl, Br, F, I, or Cl, Br, or Cl; and at least one of $R_1$, $R_2$ and $R_3$ is an alkyl. In a further embodiment, $R_1$, $R_2$ and $R_3$ are each independently selected from C1-C10 alkyls or C1-C5 alkyls or C1-C3 alkyls.

In one embodiment, for Compound 3, $R_1$, $R_2$ and $R_3$ are each independently selected from alkyls. In a further embodiment, $R_1$, $R_2$ and $R_3$ are each independently selected from C1-C10 alkyls or C1-C5 alkyls or C1-C3 alkyls.

In one embodiment, for Compound 3, $R_1$ and $R_2$ are each independently selected from alkyls, and $R_3$ is selected from halides. In a further embodiment, $R_1$ and $R_2$ are each independently selected from C1-C10 alkyls or C1-C5 alkyls or C1-C3 alkyls; and $R_3$ selected from Cl, Br, F, I, or Cl, Br, or Cl.

In one embodiment, the "metal alkyl-containing compound" is selected from the following:

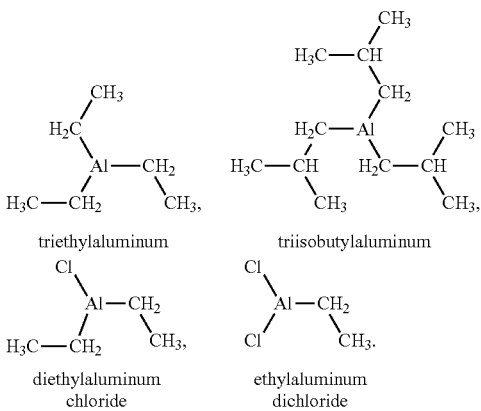

triethylaluminum    triisobutylaluminum diethylaluminum    ethylaluminum
chloride           dichloride In one embodiment, the "metal alkyl-containing compound" is selected from the following:

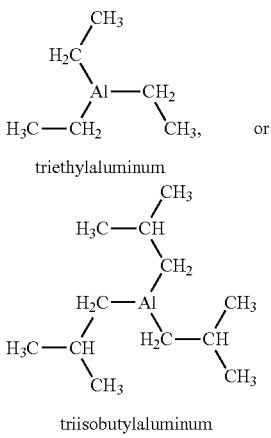

triethylaluminum triisobutylaluminum

In one embodiment, the "metal alkyl-containing compound" is selected from the following: aluminoxanes or alkyl aluminoxanes. Alkyl aluminoxanes include, but are but not limited to, methylaluminoxanes and isobutylaluminoxanes.

In one embodiment, the "metal alkyl-containing compound" is selected from the following: MMAO, MMAO-3A, or isobutyl aluminoxane, or combinations thereof; or MMAO; or MMAO-3A.

In one embodiment, the "metal alkyl-containing compound" is selected from the following: MMAO, or MMAO-3A; or MMAO; or MMAO-3A.

An "metal alkyl-containing compound" may comprise any one of the embodiments as described herein.

An "metal alkyl-containing compound" may comprise two or more embodiments as described herein.

Polymerization Process

For producing an inventive ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 meters. The beginning of a reaction zone for either type of reactor is typically defined by the side injection of either initiator of the reaction, ethylene, chain transfer agent, comonomer(s), as well as any combination thereof. A high pressure process can be carried out in autoclave or tubular reactors having one or more reaction zones, or in a combination of autoclave and tubular reactors, each comprising one or more reaction zones.

Ethylene used for the production of the ethylene-based polymer may be purified ethylene, which is obtained by removing polar components from a loop recycle stream, or by using a reaction system configuration, such that only fresh ethylene is used for making the inventive polymer. It is not typical that purified ethylene is required to make the ethylene-based polymer. In such cases ethylene from the recycle loop may be used.

In one embodiment, the ethylene-based polymer is a polyethylene homopolymer.

In another embodiment, the ethylene-based polymer comprises ethylene and one or more comonomers, and preferably one comonomer. Comonomers include, but are not limited to, α-olefin comonomers, typically having no more than 20 carbon atoms. For example, the α-olefin comonomers may have 3 to 10 carbon atoms, or may have 4 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent (by the combined weight) of one or more additives, based on the weight of the inventive composition.

In one embodiment, the polymers of this invention are treated with one or more stabilizers, for example, antioxidants, such as IRGANOX 1010, IRGANOX 1076 and IRGAFOS 168 (Ciba Specialty Chemicals; Glattbrugg, Switzerland). In general, the polymers are treated with one or more stabilizers before extrusion or other melt processes.

Processing aids, such as plasticizers, include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils, useful as processing aids, include white mineral oil such as KAYDOL oil (Chemtura Corp.; Middlebury, Conn.) and SHELLFLEX 371 naphthenic oil (Shell Lubricants; Houston, Tex.). One other suitable oil is TUFFLO oil (Lyondell Lubricants; Houston, Tex.).

Blends and mixtures of the inventive polymer with other polymers may be performed. Suitable polymers for blending with the inventive polymer include natural and synthetic polymers. Exemplary polymers for blending include propylene-based polymers (both impact modifying polypropylene, isotactic polypropylene, atactic polypropylene, and random ethylene/propylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene, catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers, ethylene-based (for example, polymers available under the trade designations AFFINITY Plastomers and ENGAGE Elastomers (The Dow Chemical Company) and EXACT (ExxonMobil Chemical Co.)). Propylene-based copolymers (for example, polymers available under the trade designation VERSIFY Plastomers & Elastomers (The Dow Chemical Company) and VISTA-MAXX (ExxonMobil Chemical Co.)) can also be useful as components in blends comprising an inventive polymer.

Applications

The polymers of this invention may be employed in a variety of conventional thermoplastic fabrication processes to produce useful articles, including, but not limited to, monolayer and multilayer films; molded articles, such as blow molded, injection molded, or rotomolded articles; coatings; fibers; and woven or non-woven fabrics.

An inventive polymer may be used in a variety of films, including but not limited to, lamination films, clarity shrink films, collation shrink films, cast stretch films, silage films, stretch hood, sealants, and diaper backsheets.

An inventive polymer is also useful in other direct end-use applications. An inventive polymer may be used for wire and cable coating operations, in sheet extrusion for vacuum forming operations, and forming molded articles, including the use of injection molding, blow molding process, or rotomolding processes.

Other suitable applications for the inventive polymers include, but are not limited to, films, fibers; molded parts, gaskets and profiles; auto interior parts and profiles; foam goods (both open and closed cell); impact modifiers for other thermoplastic polymers, such as high density polyethylene, or other olefin polymers; cap liners; wire and cable coatings, and flooring materials. The high vinyl levels in the inventive polymers can be used in applications that require polymer modification and/or crosslinking (for example, see EP 2256158A1, EP 2256159A1, and WO 97/45465; each incorporated herein by reference).

DEFINITIONS

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "interpolymer," as used herein, refers to polymers prepared by the polymerization of at least two different types of monomers. The generic term interpolymer includes copolymers (employed to refer to polymers prepared from two different monomers), and polymers prepared from more than two different types of monomers.

The term "ethylene-based polymer," as used herein, refers to a polymer that comprises a majority amount of polymerized ethylene monomer (based on weight of the polymer) and, optionally, may contain at least one comonomer.

The term "ethylene/α-olefin interpolymer," as used herein, refers to an interpolymer that comprises a majority amount of polymerized ethylene monomer (based on the weight of the interpolymer) and at least one α-olefin.

The term, "ethylene/α-olefin copolymer," as used herein, refers to a copolymer that comprises a majority amount of polymerized ethylene monomer (based on the weight of the copolymer), and an α-olefin, as the only two monomer types.

The term "propylene-based polymer," as used herein, refers to a polymer that comprises a majority amount of polymerized propylene monomer (based on weight of the polymer) and, optionally, may comprise at least one comonomer.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

TEST METHODS

Density

Samples for density measurements were prepared according to ASTM D 4703-10. Samples were pressed at 374° F. (190° C.) for five minutes at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements are made within one hour of sample pressing using ASTM D792-08, Method B.

Melt Index

Melt index, MI or I2, is measured in accordance with ASTM D 1238-10, Condition 190° C./2.16 kg, and is reported in grams eluted per 10 minutes.

Conventional GPC

The GPC system consists of a Waters (Milford, Mass.) model 150 C High Temperature Chromatograph, equipped with an IR4 infra-red detector from Polymer Char (Valencia, Spain). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used, such as four 30 cm long Shodex HT803 13 micron columns, or four 30 cm Polymer Labs columns of 20-micron mixed-pore-size packing (MixA LS, Polymer Labs). Here, the MixA LS columns were used. The sample carousel compartment is operated at 140° C., and the column compartment is operated at 150° C. The samples are prepared at a concentration of "0.1 grams of polymer in 50 milliliters of solvent." The chromatographic solvent and the sample preparation solvent is "1,2,4-trichlorobenzene (TCB) containing 200 ppm of 2,6-di-tert-butyl-4methylphenol (BHT)." The solvent is sparged with nitrogen. The polymer samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 g/mol to 8,400,000 g/mol, and the standards are contained in six "cocktail" mixtures. Each standard mixture has at least a decade of separation between individual molecular weights. The standard mixtures are purchased from Polymer Laboratories. The polystyrene standards are prepared at "0.025 g in 50 mL of solvent" for molecular weights equal to, or greater than, 1,000,000 g/mol, and at "0.05 g in 50 mL of solvent" for molecular weights less than 1,000,000 g/mol. The polystyrene standards are dissolved at 80° C., with gentle agitation, for 30 minutes. The narrow standards mixtures are run first, and in order of decreasing "highest molecular weight" component to minimize degradation. The polystyrene standard peak molecular weights are converted to polyethylene molecular weight using Equation (1) (as described in Williams and Ward, J. Polym. Sci., Polym. Letters, 6, 621 (1968)):

$$M\text{polyethylene} = A \times (M\text{polystyrene})^B \tag{Eq. 1}$$

where M is the molecular weight of polyethylene or polystyrene (as marked), and B is equal to 1.0. It is known to those of ordinary skill in the art that "A" may be in a range from about 0.38 to about 0.44, and is determined at the time of calibration using a broad polyethylene standard. Use of this polyethylene calibration method to obtain molecular weight values, such as the molecular weight distribution (MWD or Mw/Mn), and related statistics, is defined here as the modified method of Williams and Ward. The number average molecular weight, and the weight average molecular weight are calculated from the following equations.

$$Mw_{CC} = \sum_i \left( \frac{C_i}{\sum_i C_i} \right) M_i = \sum_i w_i M_{cc,i} \tag{Eq. 2}$$

$$M_{n,cc} = \sum w_i / \sum (w_i / M_{cc,i}) \tag{Eq. 3}$$

1H NMR

Sample Preparation (1H for End Groups/Unsaturation)

The samples were prepared by adding approximately "130 mg of sample" to "3.25 g of 50/50 by weight Tetrachlorethane-d2/Perchloroethylene with 0.001 M Cr(AcAc)

3" in a NORELL 1001-7, 10 mm NMR tube. The samples were purged by bubbling nitrogen (N2) through the solvent, via a pipette inserted into the tube, for approximately five minutes, to prevent oxidation. Each tube was then capped, sealed with TEFLON tape, and then soaked at room temperature, overnight, to facilitate sample dissolution. The samples were kept in a N2 purge box during storage before, and after, preparation to minimize exposure to oxygen (O2). The samples were heated and vortexed at 115° C. to ensure homogeneity.

Data Acquisition Parameters (1H for End Groups/Unsaturation)

1H NMR was performed on a Bruker AVANCE 400 MHz spectrometer, equipped with a Bruker Dual DUL high-temperature CryoProbe, and at a sample temperature of 120° C. Two experiments were run to obtain spectra, a control spectrum to quantitate the total polymer protons, and a double presaturation experiment, which suppresses the intense polymer backbone peaks, and enables high sensitivity spectra for quantitation of the end-groups. The control was run with ZG pulse, 4 scans, SWH 10,000 Hz, AQ 1.64 s, D1 14 s. The double presaturation experiment was run with a modified pulse sequence, TD 32768, 100 scans, DS 4, SWH 10,000 Hz, AQ 1.64 s, D1 1 s, D13 13 s.

Data Analysis—Calculations for "vinyls/1000 C"

Figure 2:
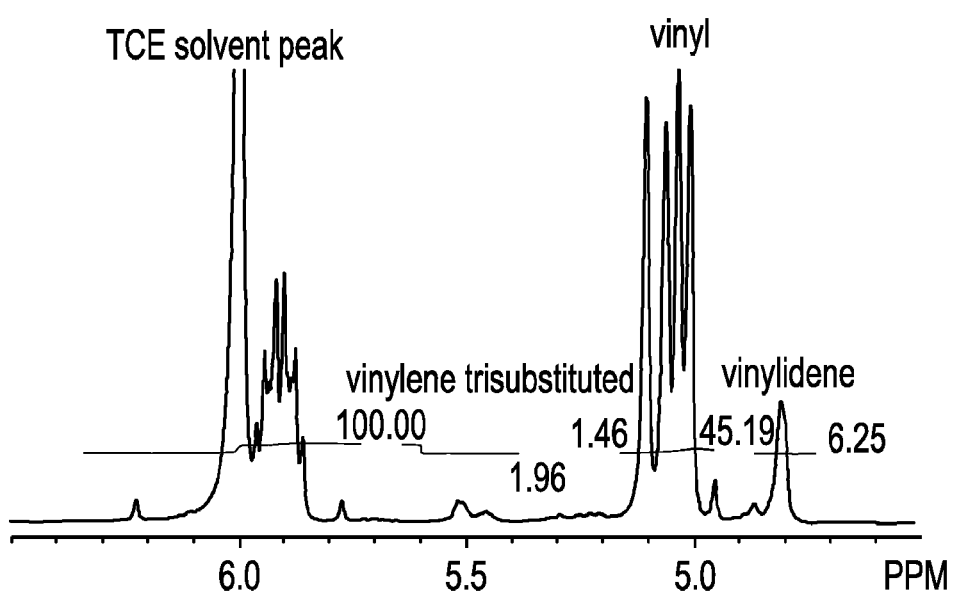
FIG. 2 depicts the 1H NMR spectrum, with presaturation, of an inventive LDPE (Example 5).

Two experiments were run to obtain spectra, a control spectrum to quantitate the total polymer protons, and a double presaturation experiment, which suppresses the intense polymer backbone peaks, and enables high sensitivity spectra for quantitation of the unsaturation. For example, see FIGS. 1 and 2 (Example 5).

The signal from residual 1H in TCE-d2 (at 6.0 ppm) is integrated, and set to a value of 100, and the integral from 3 to −0.5 ppm is used as the signal from the whole polymer in the control experiment. For the presaturation experiment, the TCE signal is also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene are integrated.

The integral of the whole polymer from the control experiment is divided by 2 to obtain a value representing X thousands of carbons (i.e., if the polymer integral=28,000, this represents 14,000 carbons, and X=14).

The unsaturated group integrals, divided by the corresponding number of protons contributing to that integral, represent the moles of each type of unsaturation per X thousand carbons.

Dividing the moles of each type of unsaturation by X then gives moles unsaturated groups per 1000 moles of carbons.

13C NMR

Sample Preparation

The samples were prepared by adding approximately 2.7 g of a "50/50 mixture of tetrachloroethane-d2/orthodichlorobenzene containing 0.025 M Cr(AcAc)3" to "0.25 g sample" in a NORELL 1001-7, 10 mm, NMR tube. The samples were dissolved and homogenized, by heating the tube and its contents to 150° C., using a heating block and heat gun. Each sample was visually inspected to ensure homogeneity.

Data Acquisition Parameters

Figure 3:
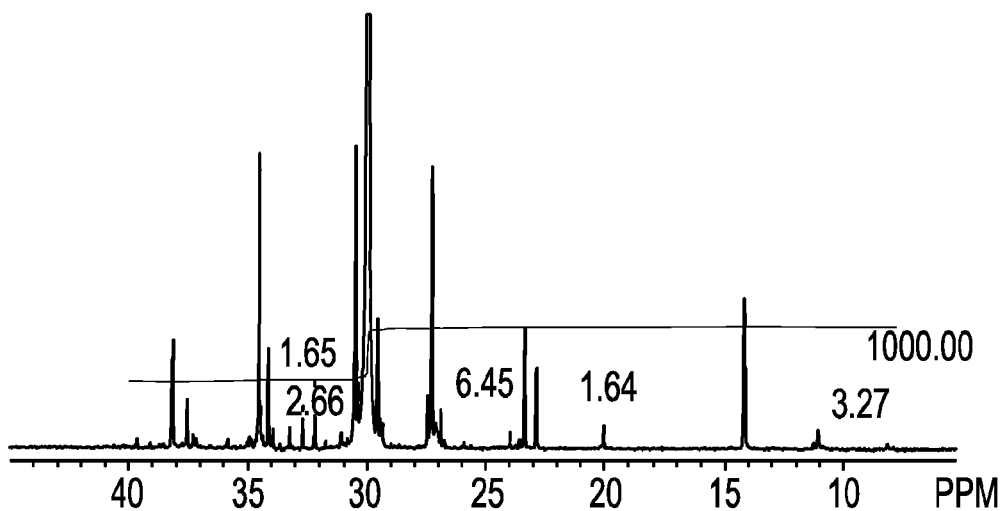
FIG. 3 depicts the 13C NMR spectrum of an inventive LDPE (Example 5).

The data were collected using a Bruker 400 MHz spectrometer, equipped with a Bruker Dual DUL high-temperature CryoProbe. The data were acquired using 320 transients per data file, a 6 sec pulse repetition delay, 90 degree flip angles, and inverse gated decoupling with a sample temperature of 120° C. All measurements were made on non-spinning samples in locked mode. Samples were allowed to thermally equilibrate for seven minutes prior to data acquisition. The 13C NMR chemical shifts were internally referenced to the EEE triad at 30.0 ppm. For example, see FIG. 3 (Example 5).

Data Analysis—Calculations—LDPE Branching

LDPE contains many types of branches, including 1,3 diethyl, C4, C5, C6 and longer, and if butene or propylene are used isolated C2 branches (from butene) or C1 (methyl, from propylene) branches are observed. All branching levels are determined by integrating the spectrum from about 40 ppm to 5 ppm, and setting the integral value to 1000, then integrating the peaks associated with each branch type, as shown in the Table A below. The peak integrals then represent the number of each branch type per 1000 C.

TABLE A

| Branch Type | Peak(s) integrated | Identity of the integrated carbon peak(s) |
| --- | --- | --- |
| 1,3 diethyl | About 10.5 to 11.5 ppm | 1,3 diethyl branch methyls |
| C1 | About 19.75 to 20.50 ppm | C1, methyls |
| C4 | About 23.3 to 23.5 ppm | Second CH2 in a 4-carbon branch, counting the methyl as the first C |
| C5 | About 32.60 to 32.80 ppm | Third CH2 in a 5-carbon branch, counting the methyl as the first C |

The C6+ is a direct measure of C6+ branches in LDPE, where the long branches are not distinguished from "chain ends." This value represents a level of branching which is defined differently for LDPE than LLDPE. The "32.2 ppm peak," representing the 3rd carbon from the end of all chains or branches of 6 or more carbons is used.

Method of Calculation of wt % and mol % Propylene in LDPE

The number of methyl branches per 1000 total carbons is determined by integrating the spectrum from about 40 ppm to 5 ppm, and setting the integral value to 1000. Then the peak due to methyls at ~20 ppm is integrated to give the value directly. Methyl branches/1000 C is then converted to wt % propylene and mol % propylene as follows.

For Example 5, there are "1.64 methyl branches/1000 C." Multiplying "1.64 times 3" gives the total number of propylene carbons per 1000 total carbons. This value is "4.92." Thus, "4.92 propylene carbons divided by 1000 total carbons," then multiplied by "100" gives weight percent of propylene (or 0.49 wt % P). To calculate the mole percent propylene, the moles of propylene are divided by the total moles of ethylene and propylene, and the result is multiplied by "100." In this example, "1.64 moles propylene," and (1000−4.92)/2=497.5 moles ethylene. Mol % P=(1.64/(1.64+497.5))*100=0.33 mol % P.

EXPERIMENTAL

Polymerizations and Polymer Properties

A high pressure "300 ml" continuous autoclave reactor was pressured with ethylene to 28,000 psi (193 MPa), at an ethylene flow rate of 12 lb/hr. Propylene was added into the ethylene stream to control the resulting polymer molecular weight. This mixture was heated to 260° C. A peroxide initiator package (a mixture of "TRIGONOX D and TRIGONOX B" in a 4:1 molar ratio, supplied by Akzo-Nobel) was fed to the reactor in order to initiate a free radical polymerization. Modified methylalumoxane (MMAO-3A solution in ISOPAR E (from ExxonMobil), 1500 wt ppm Al, based on weight of ISOPAR E) was then added to the reactor at different levels, and the resulting polymer was collected and analyzed. The propylene level was adjusted, if required, to keep the resulting polymer's melt index (I2 or MI) below 80 dg/min Polymerization conditions and conversion are shown in Table 1.

TABLE 1

Polymerization Conditions and Conversions

| Ex. | MMAO-3A solution flow to reactor (g/hr) | Actual Amt MMAO-3A added to Reactor (mol ppm Al)* | Effective Amt MMAO-3A (mol ppm Al)* | Reactor Temp. (° C.) | Propylene (mol ppm)* | Conversion (%) |
|---|---|---|---|---|---|---|
| 1 | 7.0  | 2    | 0   | 266 | 7,500  | 11.02 |
| 2 | 20.9 | 6    | 0   | 254 | 10,000 | 10.66 |
| 3 | 21.3 | 6.1  | 0   | 267 | 7,600  | 9.59  |
| 4 | 42.6 | 12.2 | 2.5 | 266 | 7,600  | 8.04  |
| 5 | 58.3 | 16.7 | 7   | 260 | 3,600  | 6.27  |

*Based on total moles of ethylene added to the reactor.

Conversion is calculated as the "lb/hr of polymer" produced divided by the "lb/hr of ethylene" fed. For example, for Example 1, ethylene was fed to the reactor at a rate of "12 lb/hr" and "1.322 lb of polymer" was collected over the course of one hour operation.

$$\text{conversion} = \frac{\text{polymer produced (lb/}hr\text{)}}{\text{ethylene fed (lb/}hr\text{)}} = \frac{1.322}{12} = 11.02\%$$

Tables 2A and 2B below show the results of five different MMAO-3A levels on the polymer properties. As seen in Table 2A, the MI (or I2) of the polymer increased with increasing MMAO-3A levels.

TABLE 2A

Effect of MMAO-3A Concentration on Polymer Properties

| Ex. | MI (dg/min) | Density (g/cc) | Mw (g/mol) | Mn (g/mol) | [Mw/Mn]$_{Conv}$ |
|---|---|---|---|---|---|
| 1 | 0.45 | 0.9181 | 120,379 | 20,873 | 5.77 |
| 2 | 1.77 | 0.9182 | 95,748  | 18,901 | 5.07 |
| 3 | 1.44 | 0.9172 | 105,341 | 19,942 | 5.28 |
| 4 | 22.2 | 0.9193 | 61,860  | 13,747 | 4.50 |
| 5 | 61.3 | 0.9283 | 40,331  | 10,974 | 3.67 |

TABLE 2B

Effect of MMAO-3A Concentration on Polymer Properties

| Ex. | Vinyl/1000C$^a$ | Unsat/1000C$^a$ | Mol %$^b$ propylene | Wt %$^c$ propylene |
|---|---|---|---|---|
| 1 | 0.16 | 0.36 | 0.49 | 0.73 |
| 2 | 0.20 | 0.43 | 0.59 | 0.89 |
| 3 | 0.16 | 0.38 | 0.53 | 0.80 |
| 4 | 0.44 | 0.68 | 0.51 | 0.76 |
| 5 | 0.91 | 1.13 | 0.33 | 0.49 |

$^a$Determined by 1H NMR.
$^b$Mole percent polymerized propylene in polymer, based on total moles of monomeric units in polymer, as determined by 13C NMR.
$^c$Weight percent polymerized propylene in polymer, based on total weight of polymer, as determined by 13C NMR.

Figure 4:
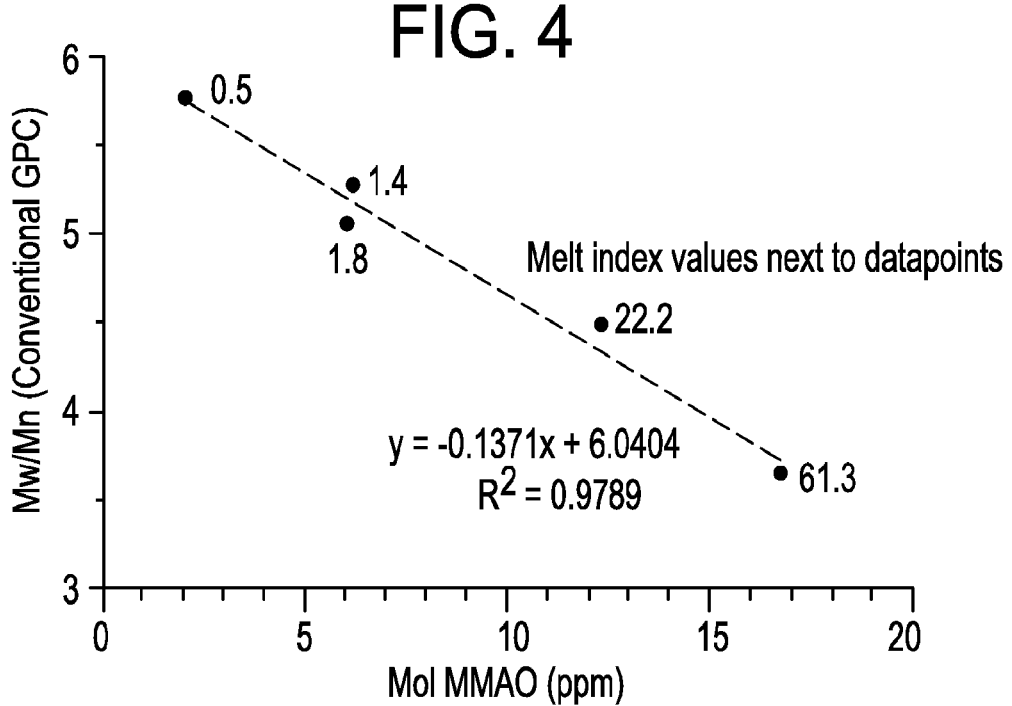
FIG. 4 depicts the effects of MMAO-3A (ppm) on molecular weight distribution (Mw/Mn) of the polymer product.
Figure 5:
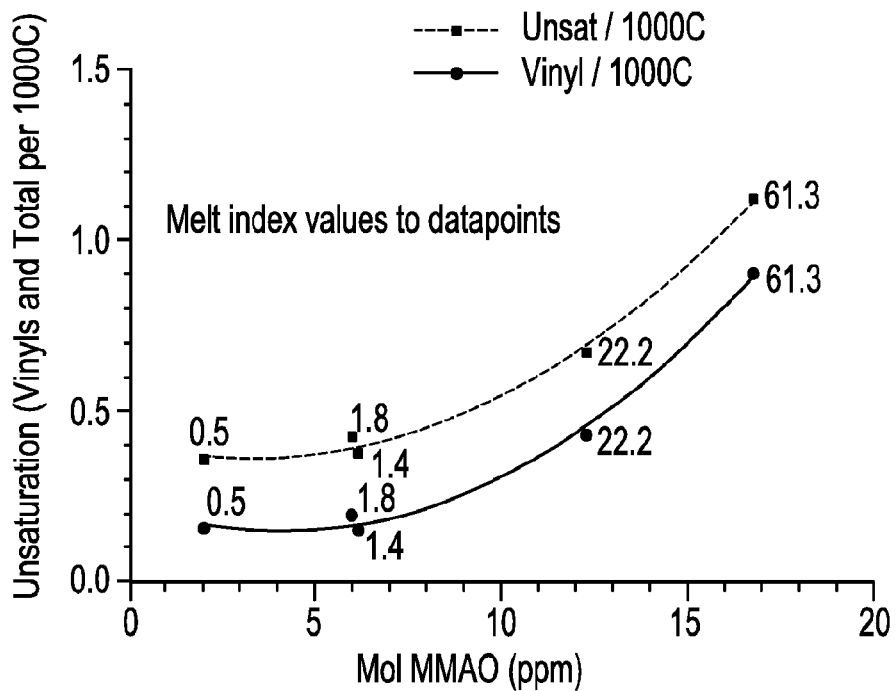
FIG. 5 depicts the effects of MMAO-3A (ppm) on vinyl content and total unsaturation in the polymer product.
Figure 6:
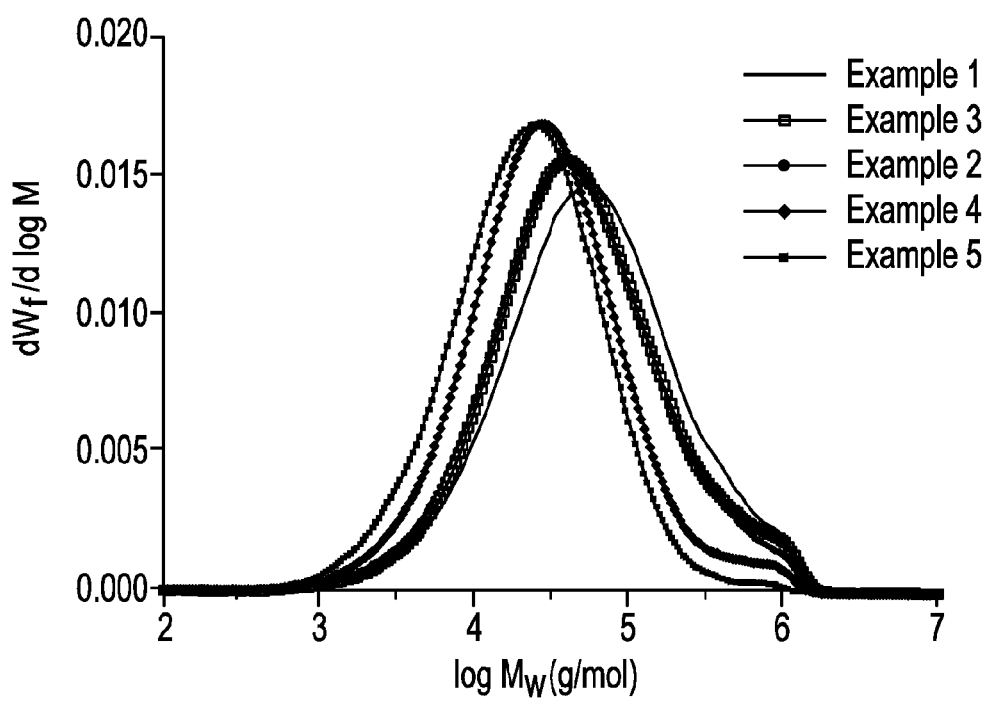
FIG. 6 depicts molecular weight distribution profiles (conventional GPC) for several low density polyethylenes.
Figure 7:
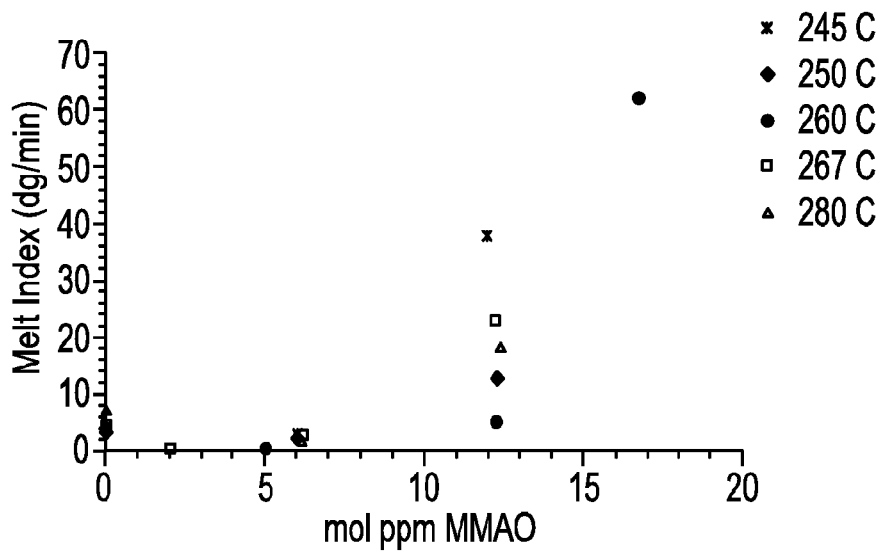
FIG. 7 depicts the effects of MMAO-3A (ppm) on melt index (I2) of the polymer product.

FIGS. 4 and 5 show the decrease in polymer MWD and the increase in unsaturated end groups, respectively, each with increasing MMAO-3A reactor concentration. FIG. 6 shows the resulting GPC of these samples, in which the narrowing of the molecular weight distribution is also observed. FIG. 7 shows the effects of MMAO concentration on melt index at different temperatures (polymerization temperature). When the amount of MMAO increased, the melt index increased, independent of temperature.

Representative Calculation of Actual Amount of MMAO-3A (mol ppm Al) in the Reactor: Example 5

The ethylene flow to the reactor was 12 lb/hr ethylene $$\frac{12 \text{ lb/}hr * 453.6 \text{ g/lb}}{28.05 \text{ g/mol}} = 194.05 \text{ mol/}hr \text{ ethylene flow} \quad \text{(Eqn. 1A)}$$

Thus, the ethylene flow to reactor was 194.05 mol/hr.

The MMAO-3A was added to the reactor as a "1,500 weight ppm solution in ISOPAR-E (1,500 g of Aluminum per 1×10$^6$ g ISOPAR-E)."

The MMAO-3A solution flow to the reactor was 58.3 g/hr.

$$58.3 \text{ }gsolution/hr * \frac{1500 \text{ }gAl}{1 \times 10^6 \text{ }gsolution} = .08745 \text{ g/}hr \text{ Al} \quad \text{(Eqn. 2A)}$$

Thus, the MMAO-3A flow to the reactor was 0.08745 g/hr aluminum.

$$\frac{0.08745 \text{ g/}hr}{26.98 \text{ g/mol}} = .00324 \text{ mol/}hr \text{ Al} \quad \text{(Eqn. 3A)}$$

Thus, the MMAO-3A flow to reactor was 0.00324 mol/hr aluminum.

$$\frac{0.00324 \text{ mol/hr Al}}{194.05 \text{ mol/hr ethylene}} * 1 \times 10^6 = 16.7 \text{ molppmAl} \quad \text{(Eqn. 4A)}$$

Thus, the actual amount of MMAO concentration in the reactor was 16.7 mole ppm aluminum.

Representative Calculation for Vinyl Groups Per Al Molecule Added to Reactor: Example 5

Comparative Polymerizations and Comparative Polymer Properties

A high pressure "300 ml" continuous autoclave reactor was pressured with ethylene to 28,000 psi (193 MPa), at an ethylene flow rate of 12 lb/hr. Propylene was added into the ethylene stream to control the resulting polymer molecular weight. This mixture was heated to 260° C. The peroxide initiator package (a mixture of "TRIGONOX D and TRIGONOX B" in a 4:1 molar ratio, supplied by Akzo-Nobel) was fed to the reactor in order to initiate a free radical polymerization. The propylene level was adjusted to modify the polymer melt index. Polymerization conditions are shown in Table 3, and polymer properties are shown in Tables 4A and 4B.

TABLE 3

Polymerization Conditions

| Comp. Ex. | Actual Amt MMAO-3A added to Reactor (mol ppm) | Reactor Temp (° C.) | Propylene (mol ppm)* |
|---|---|---|---|
| A | 0 | 242 | 5,500 |
| B | 0 | 241 | 10,000 |
| C | 0 | 243 | 15,000 |
| D | 0 | 243 | 20,000 |

*Based on total moles ethylene added to reactor.

TABLE 4A

Polymer Properties

| Comp. Ex. | Mol %[a] Propylene | Wt %[b] Propylene | MI (g/10 min) | Density (g/cc) |
|---|---|---|---|---|
| A | 0.42 | 0.62 | 0.88 | 0.9176 |
| B | 0.65 | 0.97 | 2.6 | 0.9170 |
| C | 0.91 | 1.36 | 12.4 | 0.9162 |
| D | 1.14 | 1.70 | 35.3 | 0.9158 |

[a] Mole percent polymerized propylene in polymer, based on total moles of monomeric units in polymer, as determined by 13C NMR.
[b] Weight percent polymerized propylene in polymer, based on total weight of polymer, as determined by 13C NMR.

TABLE 4B

Polymer Properties

| Comp. Ex. | Vinyl/ 1000C[c] | Unsat/ 1000C[c] | Mw[d] (g/mol) | Mn[d] (g/mol) | Mw/Mn[d] |
|---|---|---|---|---|---|
| A | 0.12 | 0.30 | 121,789 | 16,377 | 7.44 |
| B | 0.18 | 0.38 | 97,017 | 15,337 | 6.33 |
| C | 0.27 | 0.50 | 75,549 | 12,844 | 5.88 |
| D | 0.32 | 0.55 | 63,832 | 12,253 | 5.21 |

[c] Determined by 1H NMR.
[d] Determined by conventional GPC.

Polymerization conditions, vinyl and unsaturation levels for the inventive examples are shown again in Table 5.

TABLE 5

Polymerizations Run with MMAO-3A

| Ex. | Actual Amt MMAO-3A added to Reactor (mol ppm Al)* | Effective Amt MMAO-3A (mol ppm Al)* | Reactor Temp. (° C.) | Propylene (mol ppm)* | Conver. (%) | Vinyl/ 1000C | Usat/ 1000C |
|---|---|---|---|---|---|---|---|
| 1 | 2 | 0 | 266 | 7,500 | 11.02 | 0.16 | 0.36 |
| 2 | 6 | 0 | 254 | 10,000 | 10.66 | 0.20 | 0.43 |
| 3 | 6.1 | 0 | 267 | 7,600 | 9.59 | 0.16 | 0.38 |
| 4 | 12.2 | 2.5 | 266 | 7,600 | 8.04 | 0.44 | 0.68 |
| 5 | 16.7 | 7 | 260 | 3,600 | 6.27 | 0.91 | 1.13 |

*Based on total moles of ethylene added to the reactor.

Figure 8:
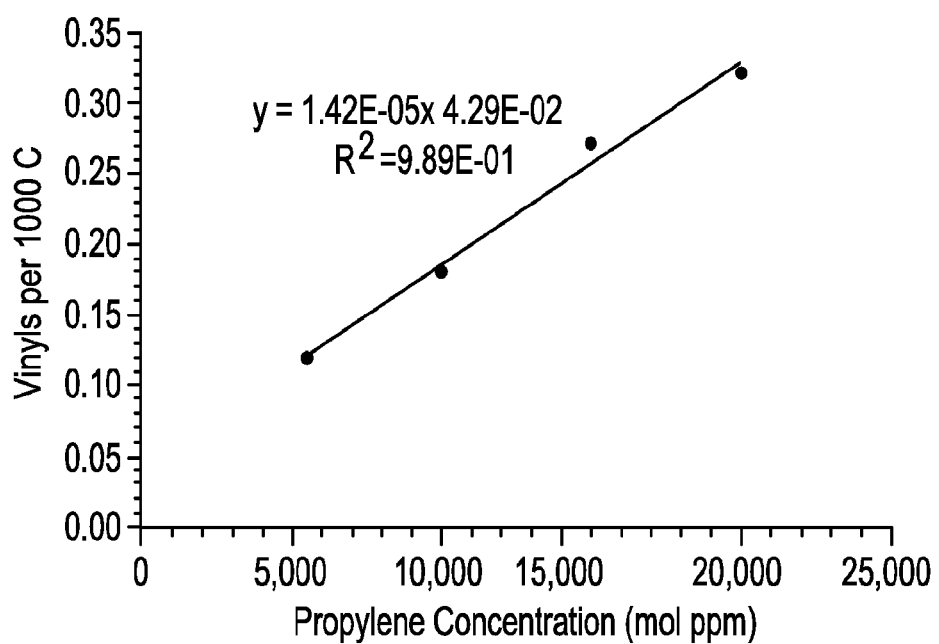
FIG. 8 depicts the effect of propylene concentration, in the absence of MMAO-3A, on vinyl group content in the polymer product.

The number of "vinyl groups produced in the absence of MMAO-3A" from propylene, and other effects, was determined by plotting the "vinyl groups per 1000 C" as a function of propylene reactor concentration, as shown in FIG. 8. From this plot, the equation for the "vinyls per 1000 C produced from other sources" is determined, as shown in Equation 1B.

$$\text{vinylsper1000 C (in absence of MMAO)} = 0.0000142*[\text{propylene}]\text{molppm} + 0.04295 \quad \text{(Eqn. 1B)}.$$

Using Equation 1B, the amount of "vinyls per 1000 C in the absence of MMAO-3A" for Example 5 is determined, as shown in Equation 2B.

$$\text{vinylsper1000 C (in absence of MMAO)} = 0.0000142*3600 + 0.04295 = 0.0941 \quad \text{(Eqn. 2B)}$$

The "vinyls per 1000 C in the absence of MMAO-3A" is subtracted from the "total vinyls per 1000 C" to determine the "vinyls per 1000 C produced by MMAO" as shown in Equation 3B below.

$$\text{vinylsper1000 C (produced from MMAO)} = 0.91 - 0.0941 = 0.816 \quad \text{(Eqn. 3B)}$$

Next, the amount of Al per 1000 carbons is calculated.

4a) Calculate Al per g PE produced $$\text{Al(mol/}gPE\text{ produced)} = \frac{\text{Al reactor concentration }(ppm)}{MW\text{ ethylene} * \text{ethylene conversion}} \quad \text{(Eqn. 4B)}$$

$$\text{Al(mol/}gPE\text{ produced)} = \quad \text{(Eqn. 5B)}$$

$$\frac{16.7 \text{ molAl}}{1 \times 10^6 \text{ molC2fed} * 28 \text{ gC2/molC2} * \frac{6.27 \text{ gPEproduced}}{100 \text{ gC2fed}}} = 9.51 \times 10^{-6}$$

4b) Calculate Al per 1000 C.

For every "1000 mol C" produced, there are "14,000 g PE" produced (assume each carbon is in the chain as $CH_2$).

$$\text{Al(mol/1000 molC)} = 9.51 \times 10^{-6} * 14000 = 0.133 \quad \text{(Eqn. 6B)}$$

Finally, the moles of vinyl groups produced by MMAO per mol MMAO are calculated.

$$\frac{\text{vinyl groups produced by } MMAO/1000 \text{ carbon}}{\text{Al added}/1000 \text{ carbon}} = \quad \text{(Eqn. 7B)}$$

$$\frac{0.816}{0.133} = 6.14 \frac{\text{vinyl groups produced by } MMAO}{\text{Al molecule}}$$

From the results shown in Equation 7B, it can be seen that MMAO-3A acts as a catalytic chain transfer agent (CTA), since more than one chain end is produced per Al molecule added to the reactor. The results for the inventive examples are shown in Table 6.

TABLE 6

Inventive Examples

| Ex. | "Vinyl/1000C from other sources (other than MMAO)" | "Vinyl/ 1000C from MMAO" | "mole Al per g PE produced" | "mole Al per 1000C produced" | "mole vinyl (from MMAO) per mole Al added" |
|---|---|---|---|---|---|
| 1 | 0.150 | 0.0105 | 6.48E-07 | 0.00907 | 1.15 |
| 2 | 0.185 | 0.0149 | 2.01E-06 | 0.0281 | 0.53 |
| 3 | 0.151 | 0.00903 | 2.27E-06 | 0.0318 | 0.28 |
| 4 | 0.151 | 0.289 | 5.42E-06 | 0.0758 | 3.81 |
| 5 | 0.0941 | 0.816 | 9.51E-06 | 0.133 | 6.14 |

Representative Calculation for the Effective Aluminum Concentration: Example 5

It is well known in the art that alkyl aluminum species will be deactivated by reacting with polar compounds. Deactivation can occur, for example, due to reaction with polar impurities in the incoming feed streams, reactions with polar compounds added to the reactor, and reaction with peroxide decomposition products. The effective aluminum concentration in the reactor is the actual amount of aluminum added to the reactor, less the amount of aluminum that has been deactivated, for example, by reactions with polar species. Only aluminum alkyl species that are still active will be expected to react as chain transfer agents.

The effective aluminum concentration (or "effective amount") is defined as the level of aluminum (metal) required to increase the vinyl groups above that expected for the same polymer produced without any alkyl aluminum (or metal alkyl-containing compound). For example, refer to the following discussion. This value can be determined by plotting the "vinyl groups per 1000 C" produced by the added alkylaluminum (as shown in Tables 5 and 6) against the "mole ppm alkylaluminum" actually added to the reactor (see FIG. 9). As discussed above, the amount of "vinyl/1000 C from other sources (other than MMAO)" is calculated from the equation derived from FIG. 8 (plot of vinyl versus mole ppm C3 in the absence of alkyl aluminum and approximately at the same reactor temperature). A regression line is drawn between all points which contain "vinyl groups per 1000 C due to alkylaluminum greater than 0.1." Using this linear equation, the value of the "mol ppm Al" added to the reactor, when the "vinyl groups per 1000 C" due to alkylaluminum is set to zero (x-intercept), determines the amount of aluminum added to the reactor that is deactivated. For any subsequent equation, the effective aluminum concentration in the reactor is then calculated as the "actual amount of aluminum concentration added to the reactor" minus the "deactivated amount of aluminum" added to the reactor. For each reactor system, the amount of aluminum deactivated will vary depending, for example, on the level of polar compounds in the system.

Figure 9:
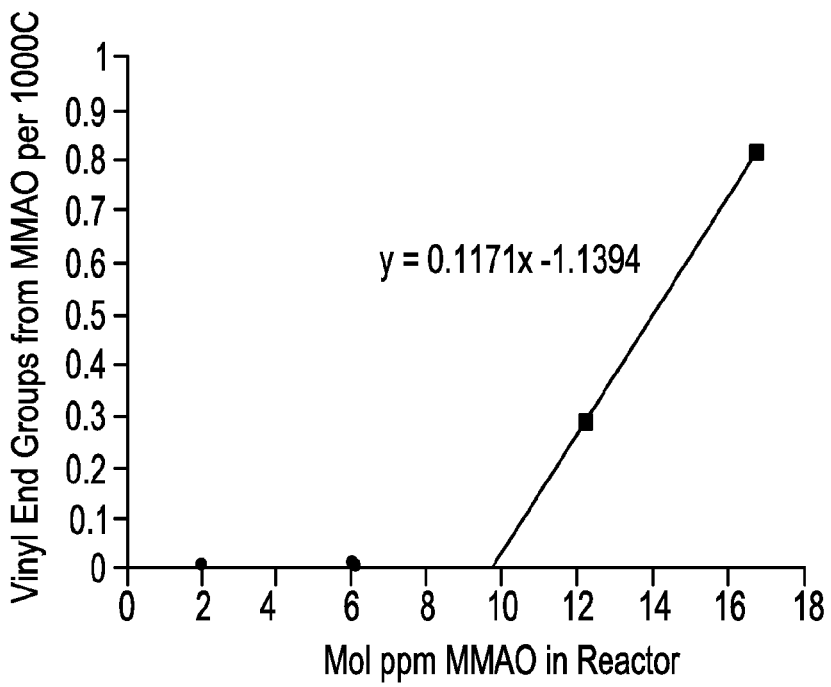
FIG. 9 depicts the "vinyl groups per 1000 C produced by the added MMAO-3A" versus the "mol ppm MMAO-3A added to the reactor."

For the inventive examples, FIG. 9 shows the "vinyl groups per 1000 C produced by the added alkylaluminum" against the "mol ppm alkylaluminum" actually added to the reactor. There are only two values in which the "vinyl groups per 1000 C produced by the added alkylaluminum" is greater than 0.1. Drawing a line through those two points gives an intercept of "9.7 mol ppm MMAO." Therefore, in each case, the effective MMAO-3A in the reactor is the actual MMAO added to the reactor minus "9.7 mol ppm MMAO-3A." If this value is a negative, then the effective aluminum concentration is zero. The effective aluminum concentration is shown in the Table 7 for these experiments.

TABLE 7

Inventive Examples

| Ex. | Actual Amt MMAO-3A added to Reactor (mol ppm Al)* | "Vinyl/1000C from MMAO-3A" | Effective Amt MMAO-3A (mol ppm Al)* |
|---|---|---|---|
| 1 | 2 | 0.0105 | 0 |
| 2 | 6 | 0.0149 | 0 |
| 3 | 6.1 | 0.00903 | 0 |
| 4 | 12.2 | 0.289 | 2.5 |
| 5 | 16.7 | 0.816 | 7.0 |

*Based on total moles of ethylene added to the reactor.

Amount of Polymerized Alpha-Olefin in Polymer

Traditionally, in order to increase the terminal vinyl content of an ethylene-based polymer, such as LDPE, an unsaturated chain transfer agent, such as propylene or 1-butene is added to the polymerization. In such conventional polymerizations, the unsaturated chain transfer agent will also copolymerize into the backbone of the polyethylene, producing a copolymer with short chain branches, thereby reducing the overall polymer density. Such conventional polymerizations also results in a vinyl content in the final polymer that increases as the mole percent of alpha-olefin incorporated into the polymer increases (a direct relationship).

Figure 10:
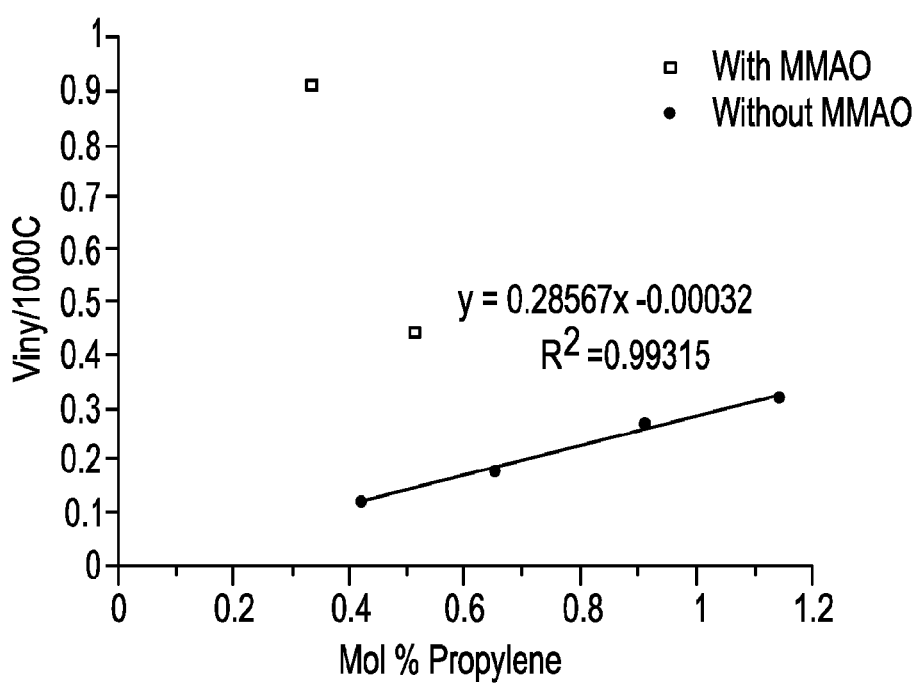
FIG. 10 depicts the "vinyl groups per 1000 C" versus "mole percent polymerized propylene" for ethylene-based polymers polymerized in the presence and absence of MMAO-3A.

The inventive polymerizations, described herein, have produced novel LDPEs that have high vinyl levels, without a correspondingly high amount of alpha-olefin incorporation in the LDPE. For example, as seen in FIG. 10, at similar reaction temperatures, the comparative polymerizations, without the MMAO-3A, produced polymers that show an increase in the amount of "vinyl per 1000 C" as the amount of propylene incorporated into the polymer increased. In contrast, the inventive polymerizations, containing effective amounts of MMAO-3A in the polymerization process, produced polymers with significantly higher amounts of "vinyl per 1000 C" at lower amounts of propylene incorporated into the polymer.

Thus, the inventive processes described herein can be used to prepare novel ethylene-based polymers with higher levels of vinyl content and lower levels of alpha-olefin incorporation into the polymer. This invention allows for a method of increasing the vinyl content in the polymer, without an unsaturated chain transfer agent, for example, an alpha-olefin, allowing for the production of higher density polymers with increased terminal vinyl content.

Branching Levels

Branching levels from 13C NMR for Inventive Examples 1-5 are shown in Table 8, and branching levels for Comparative Examples A-D are shown in Table 9.

TABLE 8

Complete Branching Levels in Branches/1000C

| Ex. | MI (dg/min) | C4 | C5 | C6+ | C1 | 1,3 diethyl | C2 on Quat Carbon[a] |
|---|---|---|---|---|---|---|---|
| 1 | 0.45 | 6.53 | 1.77 | 2.0 | 2.43 | 3.3 | 1.0 |
| 2 | 1.77 | 6.56 | 2.02 | 2.5 | 2.97 | 3.8 | 1.3 |
| 3 | 1.44 | 6.75 | 1.65 | 1.7 | 2.66 | 3.8 | 1.0 |
| 4 | 22.2 | 6.75 | 1.72 | 2.3 | 2.54 | 4.1 | 1.3 |
| 5 | 61.3 | 6.45 | 1.65 | 2.7 | 1.64 | 3.3 | 1.0 |

[a]Also termed gem-diethyl or geminal-diethyl, which are two C2 branches on the same carbon, i.e., a quaternary carbon.

TABLE 9

Branching Levels in Branches/1000C

| Comp. Ex. | MI (g/10 min) | C4 | C5 | C6+ | C1 | 1,3 diethyl | C2 on Quat Carbon[a] |
|---|---|---|---|---|---|---|---|
| A | 0.88 | 6.78 | 1.83 | 2.1 | 2.08 | 3.5 | 1.2 |
| B | 2.6 | 6.41 | 1.64 | 2.1 | 3.22 | 3.7 | 1.0 |
| C | 12.4 | 6.7 | 1.61 | 2.0 | 4.52 | 3.9 | 1.0 |
| D | 35.3 | 6.61 | 1.88 | 2.6 | 5.68 | 3.8 | 1.5 |

[a]Also termed gem-diethyl or geminal-diethyl, which are two C2 branches on the same carbon, i.e., a quaternary carbon.

Unsaturation levels from 1H NMR for Inventive Examples 1-5 are shown in Table 10, and unsaturation levels for Comparative Examples A-D are shown in Table 11.

TABLE 10

Unsaturation Levels per 1000C

| Ex. | MI (dg/min) | Vinyl/ 1000C | Unsat/ 1000C | Cis and Trans/ 1000C | Trisub/ 1000C | Vinylidene/ 1000C |
|---|---|---|---|---|---|---|
| 1 | 0.45 | 0.16 | 0.36 | 0.034 | 0.037 | 0.13 |
| 2 | 1.77 | 0.20 | 0.43 | 0.040 | 0.048 | 0.14 |
| 3 | 1.44 | 0.16 | 0.38 | 0.036 | 0.042 | 0.14 |
| 4 | 22.2 | 0.44 | 0.68 | 0.040 | 0.058 | 0.15 |
| 5 | 61.3 | 0.91 | 1.13 | 0.039 | 0.059 | 0.13 |

TABLE 11

Unsaturation Levels per 1000C

| Comp. Ex. | MI (g/10 min) | Vinyl/ 1000C | Unsat/ 1000C | Cis and Trans/ 1000C | Trisub/ 1000C | Vinylidene/ 1000C |
|---|---|---|---|---|---|---|
| A | 0.88 | 0.12 | 0.30 | 0.029 | 0.025 | 0.13 |
| B | 2.6 | 0.18 | 0.38 | 0.035 | 0.028 | 0.13 |
| C | 12.4 | 0.27 | 0.50 | 0.049 | 0.030 | 0.15 |
| D | 35.3 | 0.32 | 0.55 | 0.054 | 0.026 | 0.14 |

Although the invention has been described in considerable detail in the preceding examples, this detail is for the purpose of illustration, and is not to be construed as a limitation on the invention, as described in the following claims.

The invention claimed is:

1. A process to form an ethylene-based polymer, said process comprising polymerizing ethylene in the presence of at least one free-radical agent, and in the presence of a "metal alkyl-containing compound" selected from the group consisting of the following:
   i) at least one "Group II metal alkyl-containing compound,"
   ii) at least one "Group III metal alkyl-containing compound," or
   iii) a combination of i) and ii); and
   wherein the Group II metal is Zn; the Group III metal is Al; and wherein the free-radical agent is a peroxide; and
   wherein the polymerization temperature greater than, or equal to, 180° C.; and wherein the ethylene-based polymer has the following properties: a molecular weight distribution (Mw(conv)/Mn(conv)) from 2 to 6; a vinyl content greater than, or equal to, 0.3 vinyl per 1000 C; and a polymerized alpha-olefin level less than, or equal to, 1.00 mole percent, based on the total moles of polymerized monomer.

2. The process of claim 1, wherein the "metal alkyl-containing compound" is present in an effective amount less than or equal to, 100 mole ppm metal, based on the total moles of ethylene added to the polymerization.

3. The process of claim 1, wherein the "metal alkyl-containing compound" is present in an effective amount greater than zero and less than, or equal to, 100 mole ppm metal, based on the total moles of ethylene added to the polymerization.

4. The process of claim 1, wherein the "metal alkyl-containing compound" comprises at least one Al-alkyl bond.

5. The process of claim 1, wherein the "metal alkyl-containing compound" is a "Group III metal alkyl-containing compound".

6. The process of claim 1, wherein the metal is aluminum.

7. The process of claim 1, wherein the polymerization takes place in at least one reactor.

8. The process of claim 1, wherein the polymerization temperature is from 140° C. to 350° C.

9. The process of claim 1, wherein the "metal alkyl-containing compound" is selected from the following:

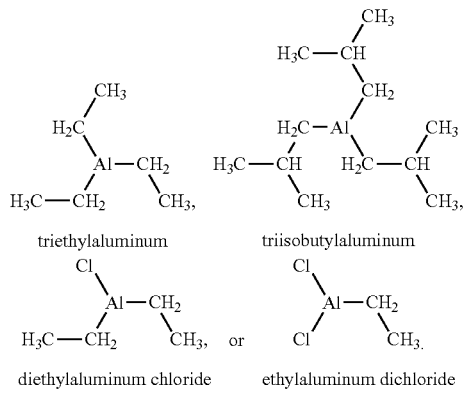

triethylaluminum   triisobutylaluminum diethylaluminum chloride   ethylaluminum dichloride 10. The process of claim 1, wherein the "metal alkyl-containing compound" is selected from the following:

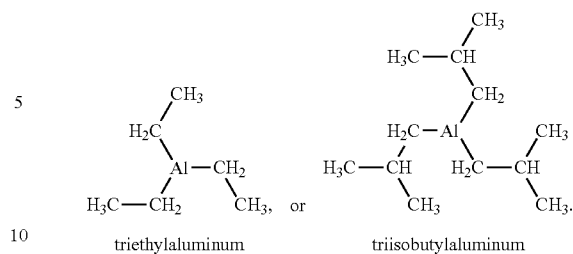

triethylaluminum   triisobutylaluminum

11. The process of claim 1, wherein the ethylene-based polymer has the following feature: $y=-0.1371x+6.0404$; where x is the molar ppm amount of MMAO added to a reactor used to polymerize the ethylene-based polymer, based on the total moles of ethylene added to the reactor, and y is the Mw(conv)/Mn(conv) of the ethylene-based polymer.

* * * * *